United States Patent
Santos et al.

(10) Patent No.: US 10,064,394 B2
(45) Date of Patent: Sep. 4, 2018

(54) BEEHIVE IN COMPOSITE MATERIAL AND MANUFACTURING PROCESS

(71) Applicants: Gil Cesar Santos, Gafanha de Nazare (PT); Carla Maria Batista Goncalves, Gafanha de Nazare (PT)

(72) Inventors: Gil Cesar Santos, Gafanha de Nazare (PT); Carla Maria Batista Goncalves, Gafanha de Nazare (PT)

(*) Notice: Subject to any disclaimer, the term of this patent is extended or adjusted under 35 U.S.C. 154(b) by 184 days.

(21) Appl. No.: 14/915,732

(22) PCT Filed: Sep. 26, 2014

(86) PCT No.: PCT/PT2014/050001
§ 371 (c)(1),
(2) Date: Mar. 1, 2016

(87) PCT Pub. No.: WO2015/047118
PCT Pub. Date: Apr. 2, 2015

(65) Prior Publication Data
US 2016/0192625 A1    Jul. 7, 2016

(30) Foreign Application Priority Data
Sep. 26, 2013 (PT) .................................. 107205

(51) Int. Cl.
*A01K 47/00* (2006.01)
*A01K 47/02* (2006.01)

(52) U.S. Cl.
CPC ............. *A01K 47/00* (2013.01); *A01K 47/02* (2013.01)

(58) Field of Classification Search
CPC ......... A01K 47/00; A01K 47/02; A01K 47/06
(Continued)

(56) References Cited

U.S. PATENT DOCUMENTS

| 2,522,511 | A |   | 9/1950  | Hageman |               |
|-----------|---|---|---------|---------|---------------|
| 3,704,471 | A | * | 12/1972 | Bielby  | A01K 47/00    |
|           |   |   |         |         | 449/13        |
| 9,801,358 | B1| * | 10/2017 | Allan   | A01K 47/06    |

FOREIGN PATENT DOCUMENTS

| DE | 834790 C | 3/1952  |
|----|----------|---------|
| FR | 510706 A | 12/1920 |

(Continued)

OTHER PUBLICATIONS

English-language translation of FR 2630300.*
International Search Report dated Sep. 15, 2015, corresponding to International Patent Application PCT/PT2014/050001.

*Primary Examiner* — Lisa L Tsang
(74) *Attorney, Agent, or Firm* — Ladas & Parry LLP; Malcolm J. MacDonald (57) ABSTRACT

A composite material for production of a beehive for apiculture use, and its manufacturing process. This composite material is made of cork and ligneous material, polymers, and optionally at least one of a fire retardant and UV protector. The percentage of polymer in the composite varies between 10% and 75% and the blend of the granulated cork with the ligneous material between 25% and 90%. The material to be used must have a particle size which permit its use in extrusion and injection production lines, because the molding of the beehives is made through one of these processes. The beehive is composed by stand (A), sidewalls (H), front and rear walls (I), inner cover (E) and outer cover (F), and can be assembled in three different ways: traditional, in ramp and in step.

8 Claims, 10 Drawing Sheets

(58) Field of Classification Search
USPC .......................................... 449/3, 29, 30, 31
See application file for complete search history.

(56) References Cited

FOREIGN PATENT DOCUMENTS

| | | | | | |
|---|---|---|---|---|---|
| FR | 2630300 | A1 | * | 10/1989 | ............. A01K 47/02 |
| GB | 644507 | A | * | 10/1950 | ............. A01K 47/02 |

* cited by examiner

BEEHIVE IN COMPOSITE MATERIAL AND MANUFACTURING PROCESS

This application is a 371 of PCT/PT2014/050001, filed on Sep. 26, 2014, which claims priority to Portuguese Application No. 107205, filed Sep. 26, 2013.

SCOPE OF THE INVENTION

This invention pertains to the field of beehives, more specifically to the creation and manufacturing of a new composite material for production of beehive for apicultures use.

BACKGROUND OF THE INVENTION

Three types of materials are known in the art, from which beehives are produced, namely:
1. The cork beehive based on a hollow cylindrical structure made from the cork oak bark. Its structure is obtained from the removal of a section with a diameter of 0.30 m and a height of 0.40 m, approximately. These beehives, called "cortiços", are a very simple and basic structure, however, it does not allow an effective human intervention in the development/inspection of their bees' colony, resulting in impractical and low efficiency beehives, mainly due to the difficulty in collecting the honey. Despite its high durability, the "cortiços" are being increasingly less used due to its low productivity.
2. The industrially used movable hive is made of pine wood. It has reasonable thermal properties but is not very resistant to weather conditions, because the material cannot undergo chemical treatments, once it is in contact with a food product. This modern design is the most used due to the innovation presented in its shape that allows the use of movable frames, making easier the handling of the colonies and significantly increasing the production.
3. The beehive made of injected plastic, presents similar characteristics to that described above, but because it is produced in plastic, with weak insulating properties, has a low acceptance by most of the beekeepers.

Advantages of the Invention

Different amounts of polymer with cork granulated and/or ligneous material can be blended to generate a new material that has the best features of both raw materials, without significant disadvantages. This is achieved by varying the percentages of each component in the blend from which the composite material is made.

Depending on the type of beehive components to be produced and the source of the ligneous material, the composite has between 10% and 75% of polymer, which will be blended with a combination of cork granulated and ligneous material in a percentage between 25% and 90%.

With the present invention, it is intended to produce a new beehive made of a composite material—a blend of polymer with cork granules and/or ligneous material.

In the present invention, two types of materials are blended to form a new material, which has thermodynamic properties similar to cork and/or ligneous material, and the physical and mechanical properties of polymers. In this context, it is noteworthy the low water permeability of hydrophobic polymers, for example, the olefins.

These properties are crucial to beekeeping because the hives need to maintain the temperature around 40° C. inside the beehive. Since the average temperature in Portugal is around 15° C., the thermal insulation is very important.

Once the vast majority of the colonies are placed outside, exposed to the weather condition, the beehive need to have a good moisture barrier which is achieved, in the present invention, through the use of polymers in its composition.

The properties and the productions cost of the final product depend on the percentages in which each material is present in the blend.

The use of polymers increase the structural and mechanical strength while the cork and/or ligneous increase the thermal insulation of the beehive. Its use also decreases the humidity inside the beehive, and thus, the salubrity conditions is improved, by reduction of bacteria and fungi colonies, highly harmful to bees. The lifetime of the beehive is also be improved since the raw material has high durability.

This is a new option for beekeepers with high financial payback due to the high durability of this material, achieved not only by the high durability of polymers but also by the long lifetime of the cork and/or ligneous material.

The scattered arrangement of the materials used in the composite, contributes to a high degree of protection from weather, particularly with regard to ultraviolet radiation, because, the most exposed surface to this radiation, the outer polymers will suffer strong degradation. However, the cork will act as a shield preventing the attack from UV on the polymer, which lies immediately behind this protective surface, thus, maintain intact its characteristics, which help holding this protective barrier in place. This advantage is definitely the major advantage that this invention provides when compared to the prior art.

BRIEF DESCRIPTION OF THE DRAWINGS

For better understanding the invention will be described by pictures, which should be considered only as examples and are not restrictive of the scope of the invention. In the pictures, due to illustrative purposes, the measurements of some elements are not at scale. The absolute and relative dimensions do not match to real ratio for the making of the invention.

FIG. 6 shows the outer cover (F) which is placed on top of the beehive. The rectangles serve as knocker (G) to ensure a spacing between the topside of the inner cover (E)—piece that lies immediately above the frame (D) and the underside of the outer cover (F). This gap has the function of helping the regulation of the temperature of the beehive and allowing the use of feeders (if needed). This knocker (G) also exist on the left inside.

In FIGS. 8, 9 and 10 is presented the spinneret profiles used to extrude the components (H) which give the sidewalls of a deep super or honey supers, and the spinneret profiles used to extrude the components (I) which will give the front and rear walls of a deep super or honey supers.

In FIGS. 11 and 12 it is possible to observe the cavities of the injection molds for the walls of the deep super and honey supers of the beehive.

DETAILED DESCRIPTION OF THE INVENTION

"Lusitana", "Reversible", "Dadant" and "Langstroth" are the usually known designations of the most common beehives. The differences between them are mainly in its dimensions.

"Stand" or "base" and "bottom board" are the components in which the hive is placed on, usually is also the entrance and exit of the hive. It may or may not be attached to the deep super.

"Deep super" or "brood chamber" is the component that is placed on top of the bottom board. It may or may not be attached to it. It is the most important part of the hive; it is where the bees are born, where the queen lives and where the new born are fed and also where the diseases develop.

"Honey deep supers" and "honey supers" are the component where the honey is produced and stored. They are placed over the deep super.

"Frame" refers to the components where bees operate, being nothing more than the rationalized distribution/organization of honeycombs, where bees produce wax which, thereafter, is used to store the honey, pollen and young bees. There are usually from 8 to 12 frames per deep super or honey supers, depending of the case, and the deep super usually has 10 frames.

"Inner cover" refers to the cover that isolates the inner side of the hive from the exterior environment.

"Outer cover" is the top of the hive, superimposed on the inner cover when it exists, which limits and protects the top of the hive from wind and water, even from intruders. It can also create an air lock that insulates the hive thermally.

"Cork granules" is the material obtained from the processes of transformation of natural cork, the result of grinding cork, scrap and other cork leftovers.

"Ligneous material" are all materials obtained from trees, waste, bark, berries and stones from the tree.

The present invention relates to a new composite material for the manufacture of beehives intended for beekeeping, which results from the addition of granular cork and/or ligneous material and polymers, and may also contain fire retardant, such as, but not only, Alumina Trihydrated and/or ultraviolet rays protector, such as, but not only, Zinc Oxide.

Biodegradable materials like cork agglomerates and/or ligneous material were chosen, because they are a natural, recyclable, non-toxic and renewable resource, with excellent thermal and acoustic insulating properties.

On the other hand, polymers were chosen due to their excellent moisture barrier properties and due to their low thermal conductivity. The polymers can be additivated with fire-retardant substances and ultraviolet light protectors which is an advantage of the polymers when compared to others equivalents compounds.

The fire-retardant addition can reduce by 20% the amount of polymer required to manufacture the product, thereby reducing the material cost.

Depending on the type of component to be produced and the nature of the ligneous material to be used, the percentage of polymer added in the composite varies between 10% and 75% and the combination of granulated cork with the ligneous material between 25% and 90%. The fire retardant and UV protector ratio are negligible when compared to the other components.

This composite material provides the mechanical strength of the polymers and the thermal resistance of cork and/or ligneous material to the beehive.

The material used must have a particle size which permit its use in extrusion and injection lines, because the molding of the beehives is made from the injection or extrusion process, and those which are produced by injection can undergo previous preparation of the blend in the extruder or other mixer equipment. This dimension must be between 0.00001 m and 0.025 m.

The cork/ligneous material must first undergo a thermal treatment in an oven to reduce its moisture, because, if present, it may affect the efficiency of the injection.

This technique allows the injection of the beehive components in a single piece or in separate pieces which are subsequently coupled. This manufacturing process allows, if necessary, an easier component replacement.

If necessary, the connection of the different pieces can be achieved by screwing or by ultrasound melting.

With this new composite material it is possible to build the beehives in three different models: Traditional, in Ramp and in Step.

Figure 13:
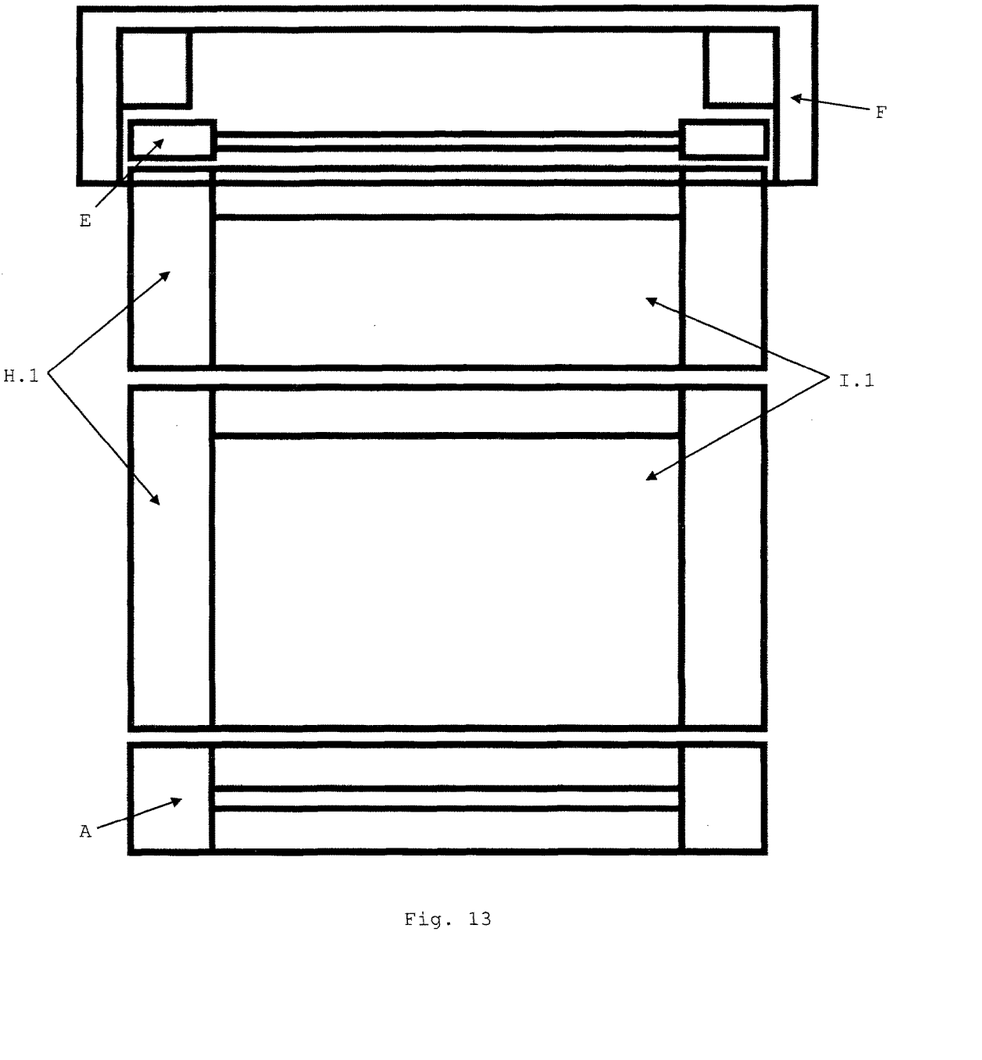
FIG. 13 shows the beehive assembled in a traditional way, being visible the stand (A), the sidewalls (H.1), the front a FIG. 13 shows the beehive assembled in a traditional way, being visible the stand (A), the sidewalls (H.1), the front and rear walls (I.1), the inner cover (E) and the outer cover (F).

FIG. 13 presents the traditional beehive (in wood) in which the upper side walls of the bottom board and the lower face walls of the deep super are horizontal, thus, when they are placed over one another, besides sliding more easily when transported, it facilitates the entry of rain and wind, which is a clear disadvantage. The models shown in FIGS. 14 and 15, so-called "in Step" model and "in Ramp", have a shape which, as their names imply, hinder the entry of rain and, in case of intake, facilitate their outflow. It is to note that these shapes have the advantage to make the transportation more stable. Using the composite material, both these models are more easy and feasible to produce than using wood.

Beehives Building

Figure 1:
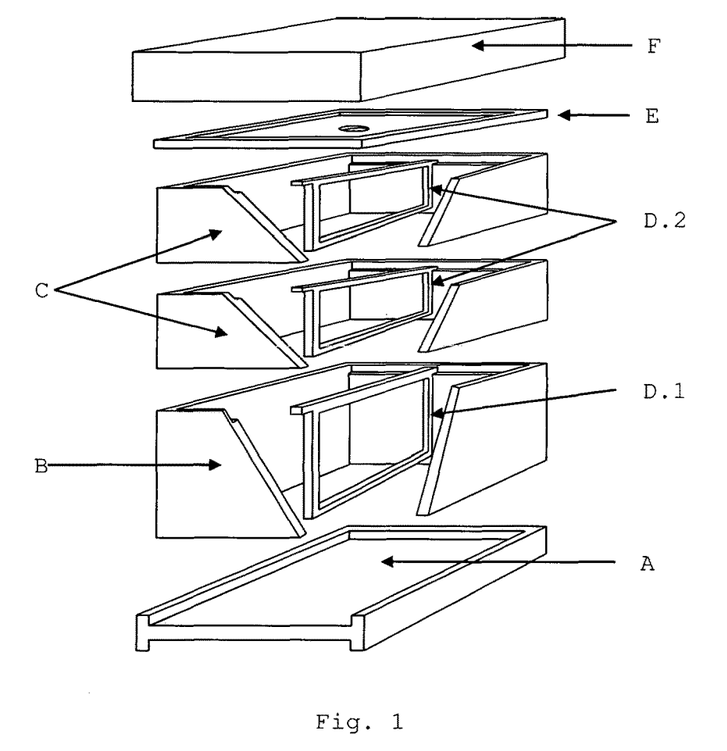
FIG. 1 shows a perspective view of a beehive with their main components: stand (A), deep super or brood chamber (B), shallow super/honey supers (C), deep super frame (D.1), honey supers frame (D.2), inner cover (E) and outer cover (F).
Figure 2:
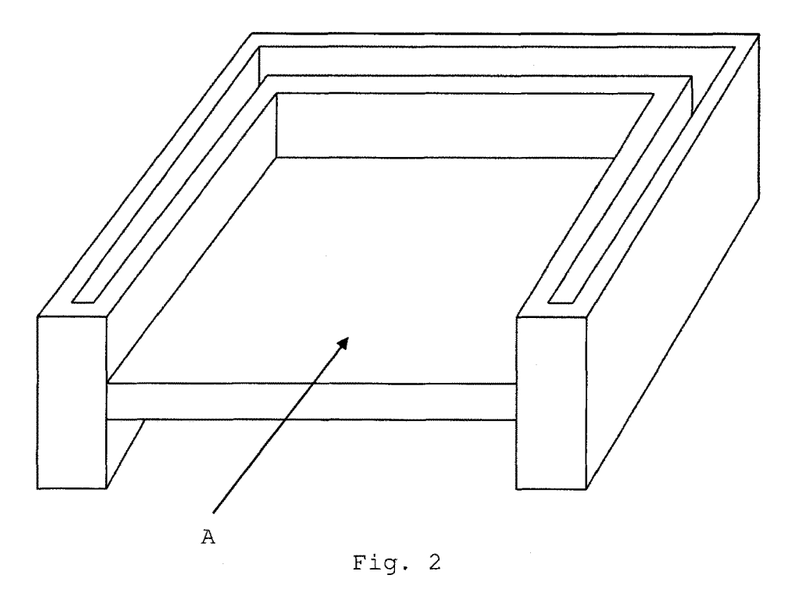
FIG. 2 shows a perspective view of the stand (A).
Figure 3:
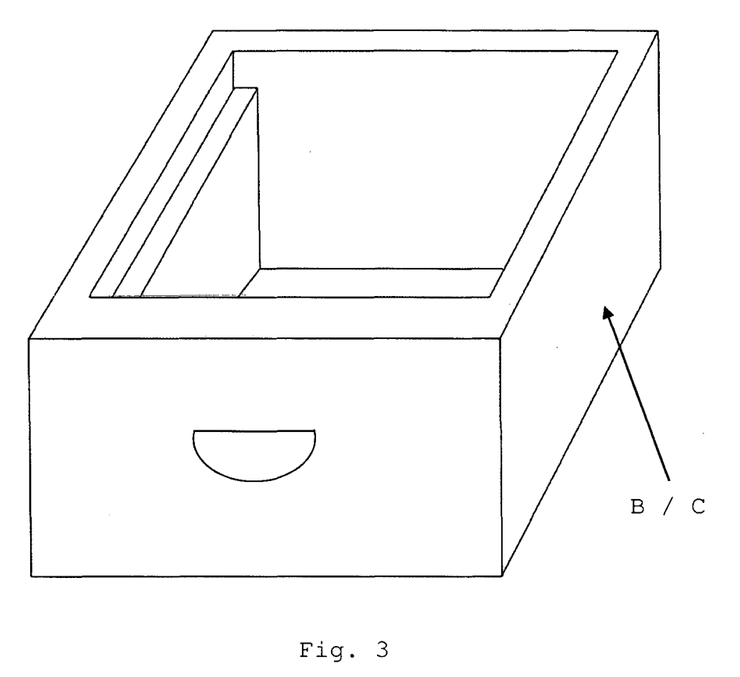
FIG. 3 shows a perspective view of the deep super (B), whose measurements may vary, depending on the type of beehive. This component can, for the same type of beehive, have several different height measurements, thus giving rise to a deep super (B) or to a honey supers (C).
Figure 4:
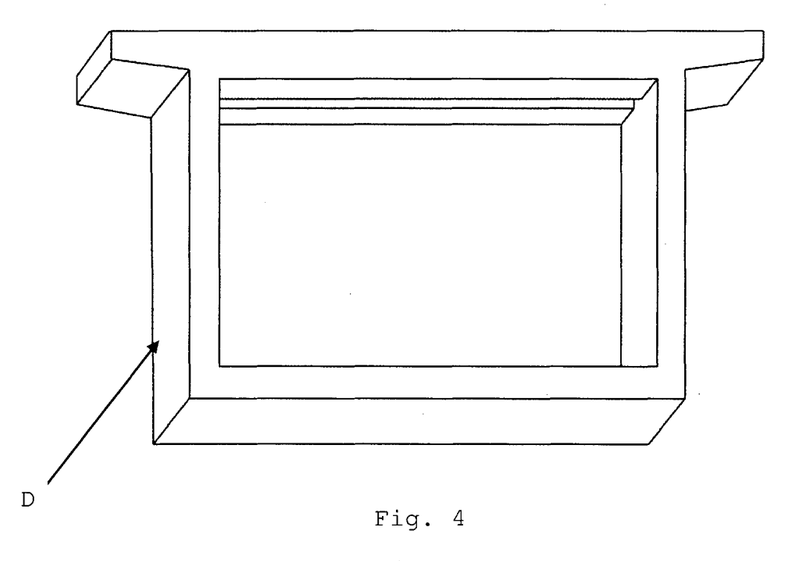
FIG. 4 shows a perspective view of a frame (D). Depending on the height, can be deep super (D.1) or honey supers (D.2).

According to FIG. 1, the beehive has a stand (A), visible in FIG. 2, upon which is placed the deep super (B), visible in FIG. 3.

Within deep super (B) there are at least 10 frames (D.1), number that depends on the model produced. Above the deep super (B) are placed the honey supers (C) that have the same format of the deep super (B), but may have a lower height depending on the model chosen.

The number of frames (D.2) used in the honey supers (C) may be inferior to the number of frames (D.1) used in the deep super (B).

Figure 5:
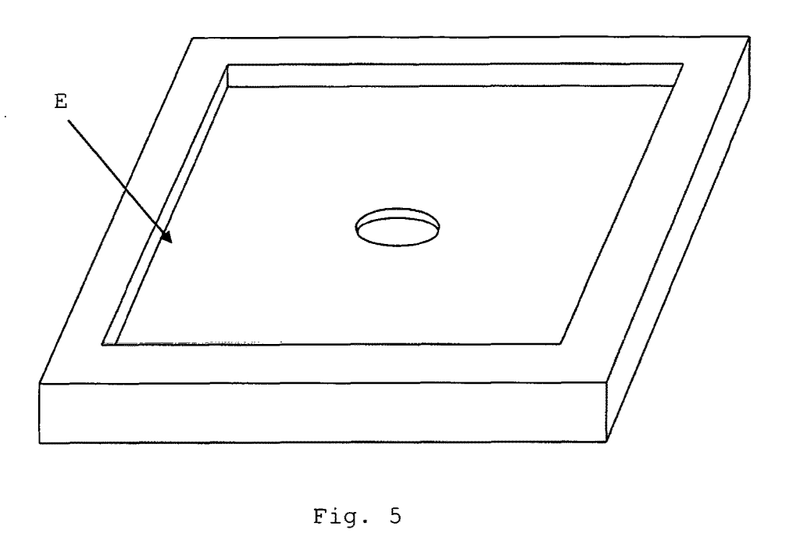
FIG. 5 shows the inner cover (E) of the beehive.
Figure 6:
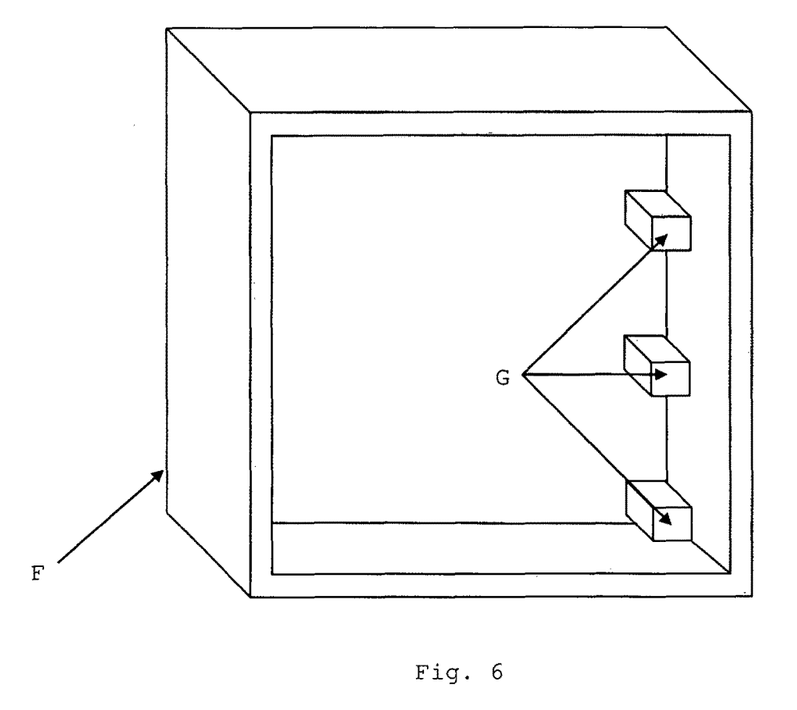
Figure 7:
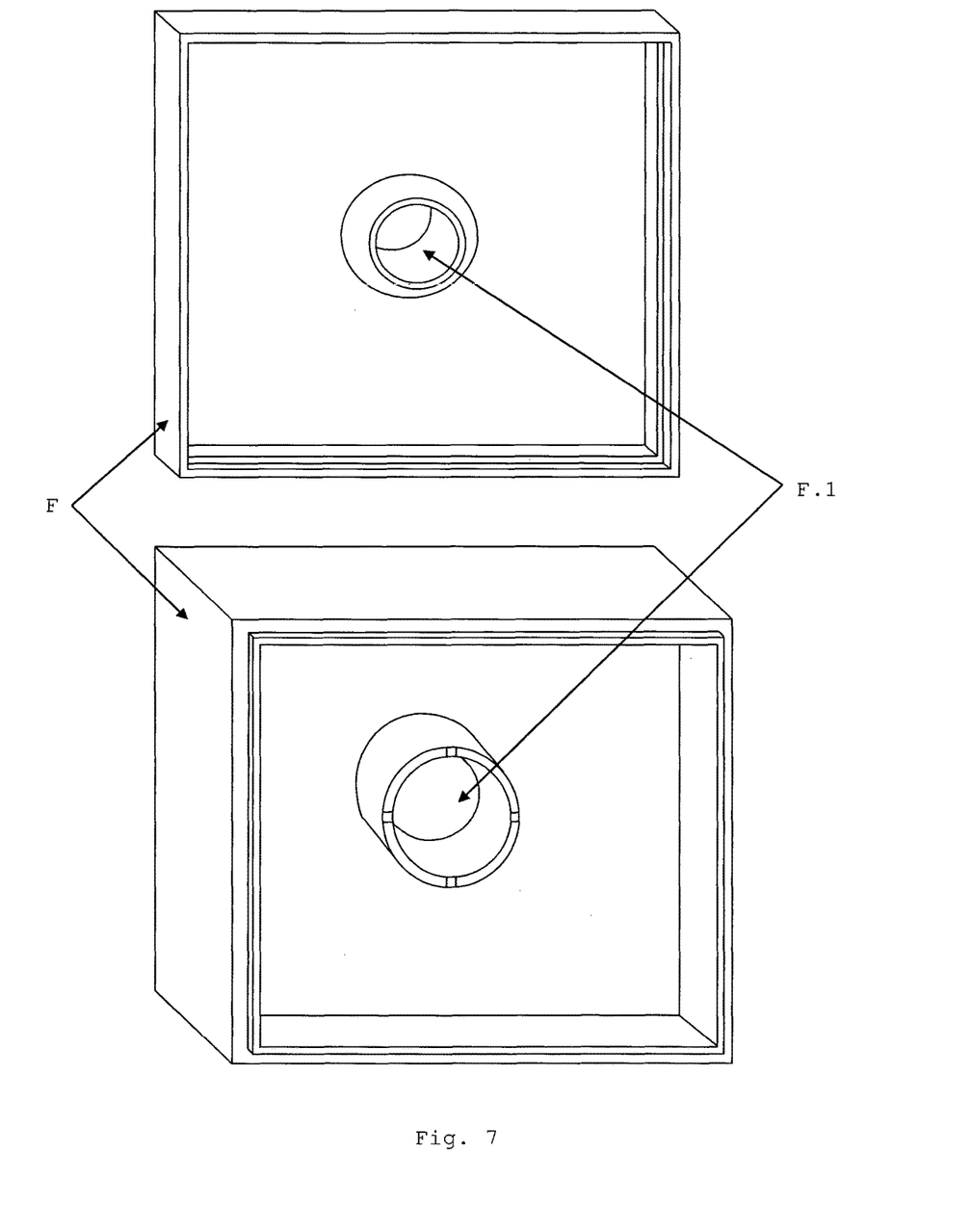
FIG. 7 shows a second embodiment of the outer cover (F), in which is placed a feeder (F.1).
Figure 8:
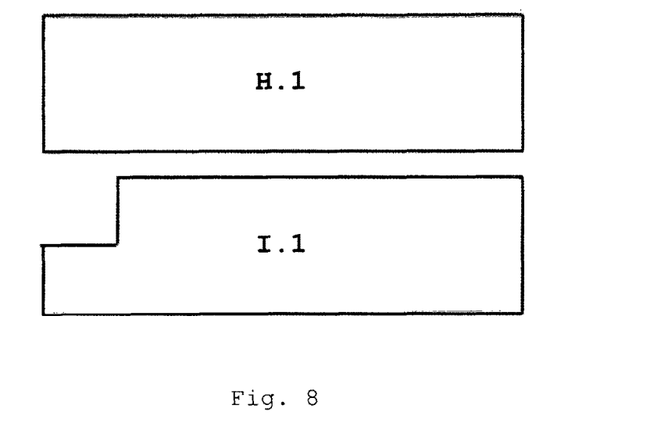
FIG. 8 shows the profiles for the production of deep super and honey supers in traditional way (H.1 and I.1)
Figure 9:
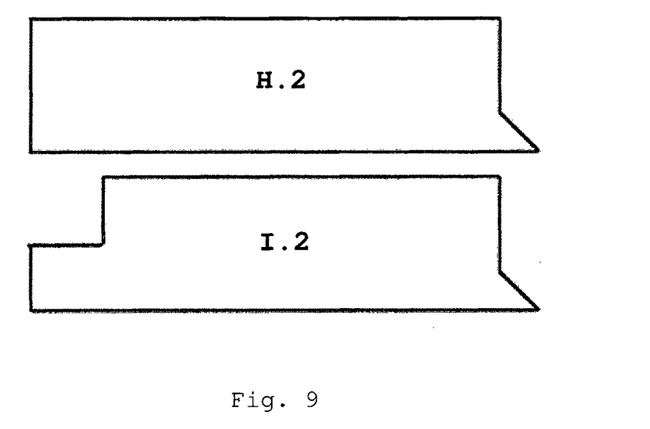
FIG. 9 shows the profiles for production of deep super and honey supers in ramp (H.2 and I.2)
Figure 10:
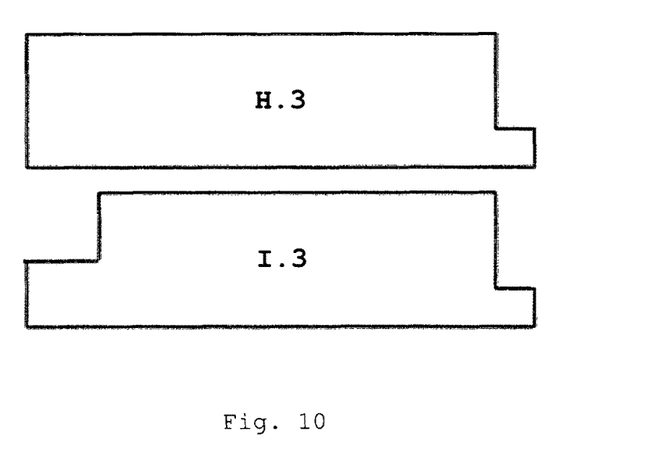
FIG. 10 shows the profiles for production of deep super, honey supers in step (H.3 and I.3).
Figure 11:
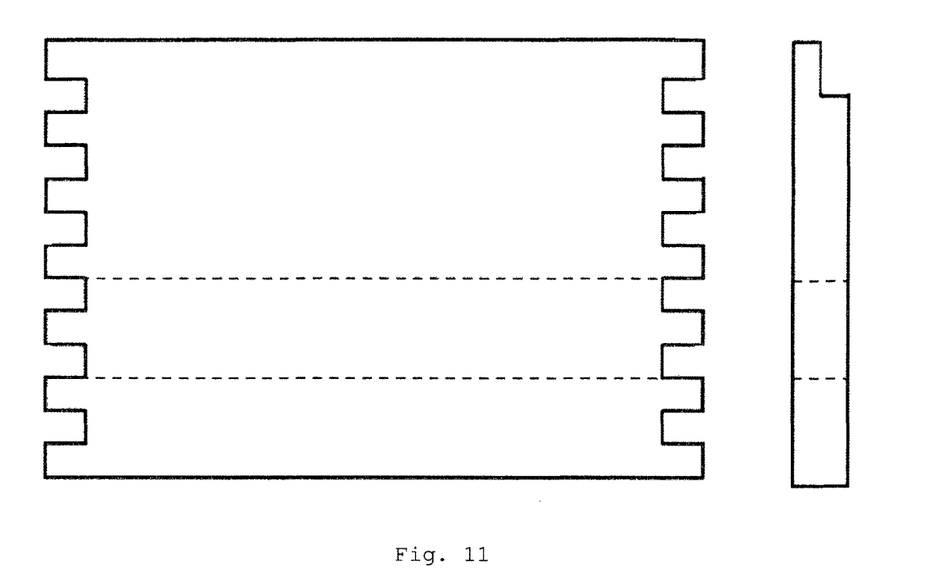
FIG. 11 shows a front and profile view of injection molds for manufacturing the front and rear walls (I.1) of the deep super and honey supers in a traditional way.
Figure 12:
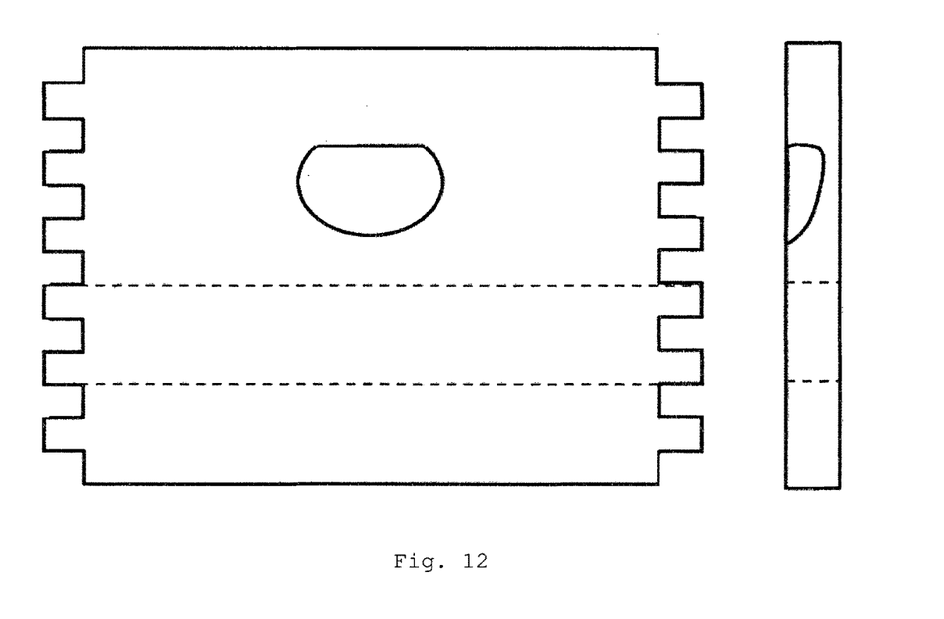
FIG. 12 shows a front and profile view of the injection molds for manufacturing both sidewalls (H.1) of the deep super and honey supers.

On top of the honey supers and the inner cover (E) is placed the outer cover (F), shown in FIG. 5 and FIG. 6, respectively.

In this invention the walls of the deep super (B), honey supers (C), namely, "Lusitana", "Reversible", "Dadant" and "Langstroth" or another, can be built in three different ways: traditional, in ramp or in step.

The main difference between the four models above mentioned is their dimensions; depending on the model, the components (H) and (I) have different dimensions.

Once they are well known characteristics of prior art and to any expert in this field of scope, a detailed explanation will not be done.

Depending on the fitting type, namely, traditional (H.1 and I.1), in ramp (H.2 and I.2) or in step (H.3 and I.3), the components (H) and (I) used to build the walls, have different shapes.

Figure 14:
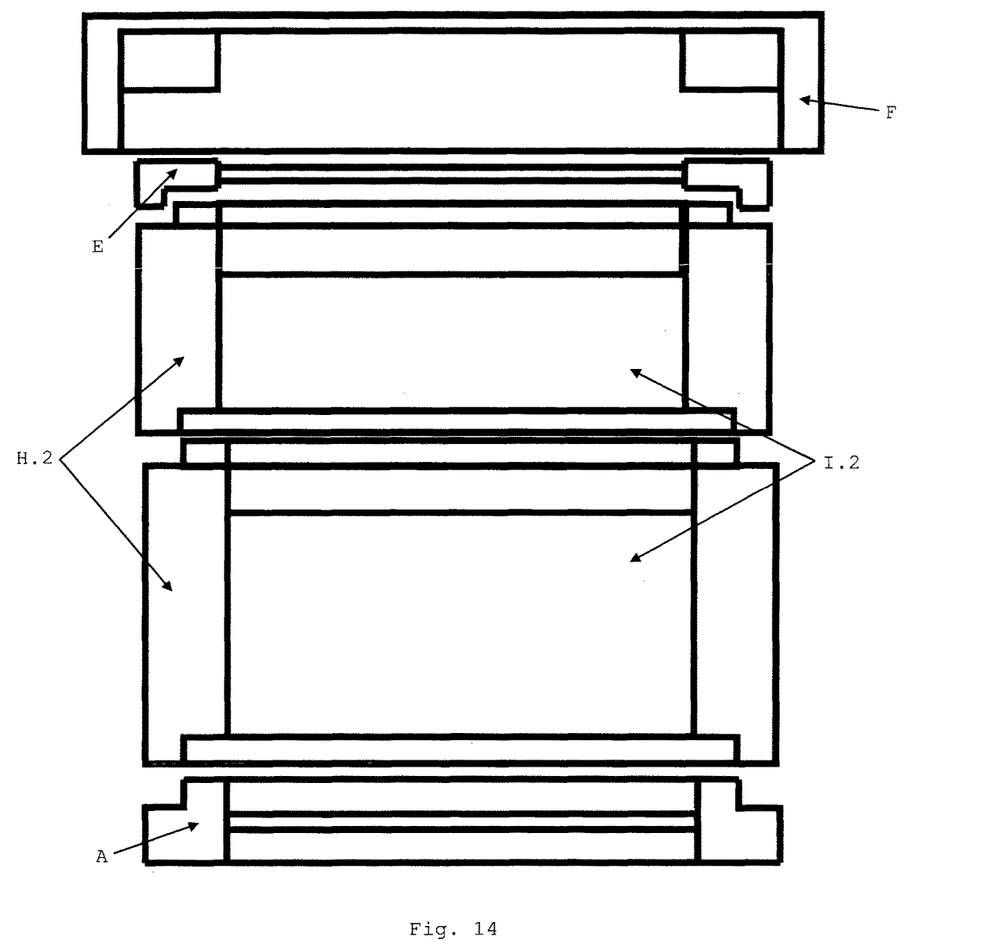
FIG. 14 shows in ramp beehive assembled, being visible the stand (A), the sidewalls (H.2), the front and rear walls (I.2), the inner cover (E) and the outer cover (F).
Figure 15:
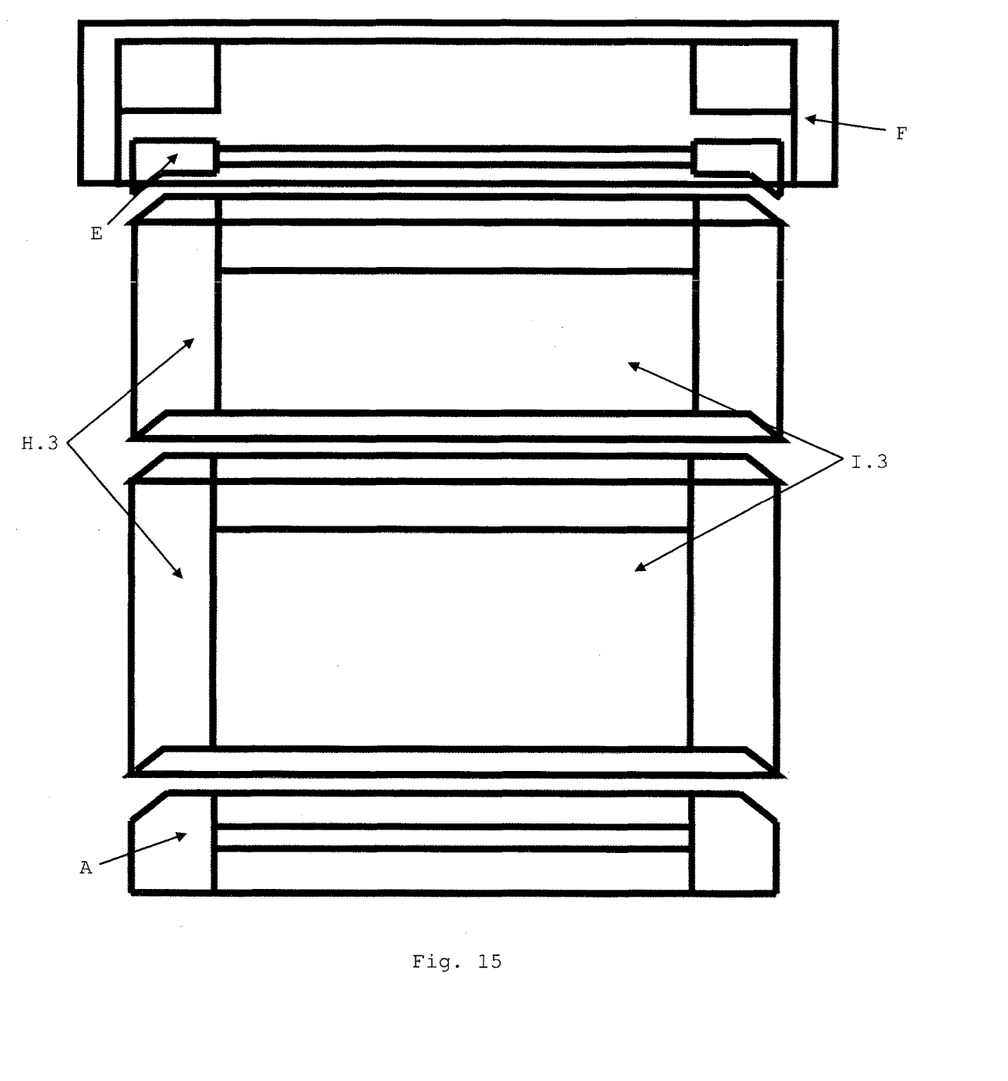
FIG. 15 shows the in step beehive assembled, being visible the stand (A), the sidewalls (H.3), the front and rear walls (I.3), the inner cover (E) and the outer cover (F).
Figure 16:
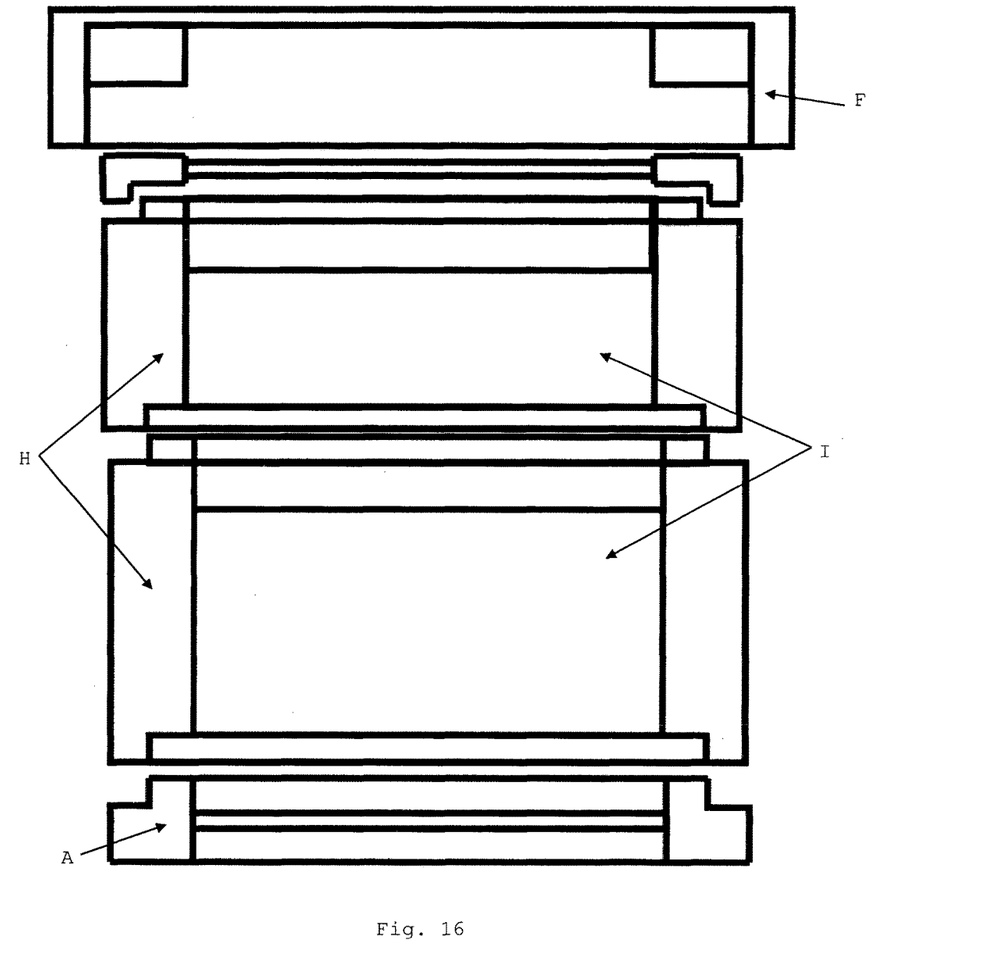
FIG. 16 shows a generic beehive assembled, being visible are the stand (A), the sidewalls (H), the front and rear walls (I), the inner cover (E), and the outer cover (F).

The models presented in FIGS. 13, 14 and 15 result from this assembly.

The invention claimed is:

1. A beehive comprising a composite material produced by blending at least two of the following materials:
   granular cork;
   a ligneous material;
   a polymer; and
   none, one, or two of the following materials:
   a fire retardant; and
   an ultraviolet protector;
   wherein the composite material comprises:
   from 10% to 75% of the polymer;
   from 25% to 90% of the granular cork and ligneous material; and
   wherein amounts of the polymer, the granular cork, and the ligneous material used in the composite material depend on a type of beehive component being produced, and on a type of the ligneous material that is used in the composite material.

2. The beehive according to claim 1, wherein the materials in the blended composite material are present in a scattered arrangement.

3. The beehive according to claim 1, wherein the beehive is constructed in ramp and in step.

4. A method of constructing a beehive comprising a composite material produced by blending at least two of the following materials:
   granular cork;
   a ligneous material;
   a polymer; and
   none, one, or two of the following materials:
   a fire retardant; and
   an ultraviolet protector;
   wherein the composite material comprises:
   from 10% to 75% of the polymer;
   from 25% to 90% of the granular cork and ligneous material; and
   wherein amounts of the polymer, the granular cork, and the ligneous material used in the composite material depend on a type of beehive component being produced, and on a type of the ligneous material that is used in the composite material
   the method comprising injecting or extruding the blended composite material.

5. The method according to claim 4, wherein the blended composite material used in the injection step or extrusion step has a particle size in a range of from 0.01 mm to 25 mm.

6. The method according to claim 4, further comprising reducing a moisture content of the granular cork and the ligneous material by thermal treatment, prior to the injection or extrusion step.

7. The method according to claim 4, wherein beehive components are produced in a single piece, or as modular components, by injection molding.

8. The method according to claim 7, wherein the modular components are connected by a screw fitting, or by ultrasonic welding.

* * * * *